United States Patent

Banks et al.

[11] Patent Number: 5,987,502
[45] Date of Patent: Nov. 16, 1999

[54] WORKLOAD MANAGEMENT IN AN ASYNCHRONOUS CLIENT/SERVER COMPUTER SYSTEM

[75] Inventors: Andrew David James Banks; Richard Scott Maxwell, both of Romsey; Daniel Noel Millwood, Southampton, all of United Kingdom

[73] Assignee: International Business Machines Corporation, Armonk, N.Y.

[21] Appl. No.: 09/152,157

[22] Filed: Sep. 11, 1998

[30] Foreign Application Priority Data

Apr. 14, 1998 [GB] United Kingdom ................... 9807683

[51] Int. Cl.⁶ ...................................................... G06F 13/00
[52] U.S. Cl. .......................................................... 709/203
[58] Field of Search ....................... 364/DIG. 1 MS File, 364/DIG. 2 MS File; 709/100, 102, 104, 105, 106, 200, 203, 219, 226, 304

[56] References Cited

U.S. PATENT DOCUMENTS 5,465,328  11/1995  Dievendorff et al. ................... 707/202
5,761,507  6/1998  Govett ..................................... 709/304

FOREIGN PATENT DOCUMENTS 2258933  2/1993  United Kingdom .
2320112  6/1998  United Kingdom .

*Primary Examiner*—Robert B. Harrell
*Attorney, Agent, or Firm*—Jeanine S. Ray-Yarletts

[57] ABSTRACT

A data processing apparatus for carrying out workload management with respect to a group of servers in an asynchronous client/server computing system, has: a device for receiving a work request from a client application; a device for consulting availability data concerning the group of servers and for selecting a particular server in the group to be used to satisfy the received work request on the basis of the consulted availability data, where the consulted availability data is always used in its present state when the work request is received, irrespective of whether availability data has been received for each server in the group, in order to select a server from the group; and a device for placing the received work request in a transmission queue where it awaits transmission to the particular server in the group.

12 Claims, 1 Drawing Sheet

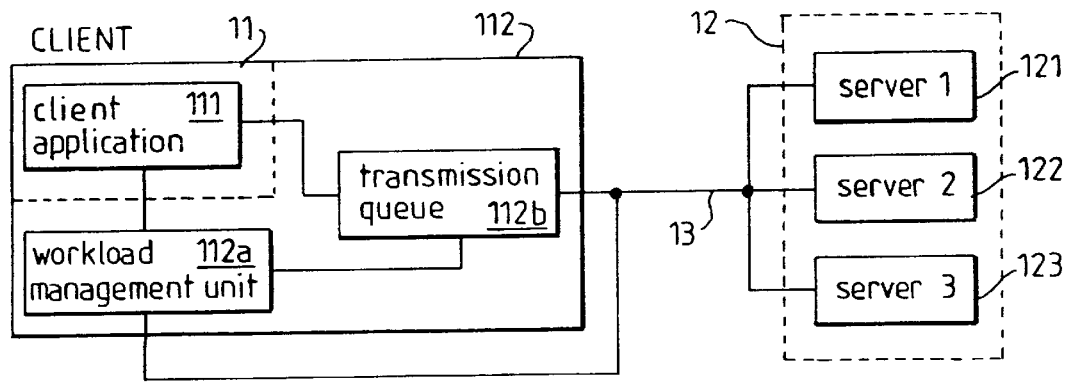
FIG. 1
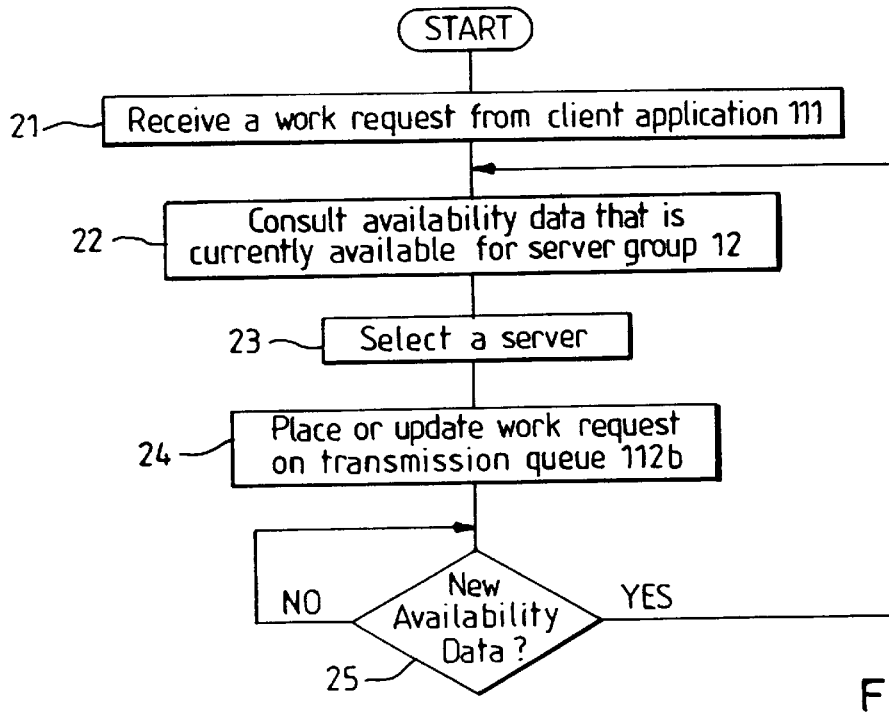
FIG. 2
| time \ server | server 1 | server 2 | server 3 |
|---|---|---|---|
| 1 | A | NA | |
| 2 | A | A | NA |
| 3 | NA | A | A |
FIG. 3

WORKLOAD MANAGEMENT IN AN ASYNCHRONOUS CLIENT/SERVER COMPUTER SYSTEM

FIELD OF THE INVENTION

The invention relates to the field of computer systems, and more specifically, client/server (also known as "distributed") computing systems, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

Message queuing (also known as message brokering) data processing technology has become more and more prevalent in today's client/server computer networks. This technology permits a client computer system to communicate with a server computer system even though these two systems are very different to each other, in terms of operating system, data format and communication protocol. Further, due to the asynchronous nature of this technology, the client can send the server a message and the server can store the message in a queue and process and respond to the message at a later time. This is quite different from the synchronous client/server models which have required the client and server to converse in real time (e.g., the client waits for the server to respond before the client carries on with other tasks).

Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). IBM and MQSeries are trademarks of IBM Corporation. IBM's MQSeries messaging software products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328, which are incorporated herein by reference.

In an asynchronous client/server network, such as one that uses a message and queuing software architecture, it is becoming more and more common to provide a group of servers in which each server of the group is capable of satisfying a client's request. This way, a client's request can be served more quickly because if one server is busy the request can be forwarded on to another server. Typically, a workload management unit on the client side makes a decision as to which server should be assigned to handle a particular request, using availability data from each server as a basis for making the decision. If all of such availability data is not yet available, the workload management unit waits until it receives such data and then uses the complete set of data to make a decision on a server. The client request, with an appended indication of the server selected by the workload management unit, is then placed in a transmission queue where it awaits transmission to the selected server. The client also writes some information about the queued request, including the indication of the selected server, to local storage so that the request can be sent again from the client to the server if a transmission problem occurs such that the server has not received the transmitted client request.

The present state of the art in this area is disadvantageous because the workload management unit must involve complex software portions which must continually check the state of the server availability data for each server to determine when all of such data has been completed received from the servers. This complex software programming adds a great deal of extra cost to the overall system.

Further, if all of the server availability data has not yet been received, a request cannot be transmitted to the server group, thus holding up the data transmission process at the client side. This is highly disadvantageous, especially in an environment where a fast transmission speed is very important.

SUMMARY OF THE INVENTION

According to a first aspect, the present invention provides a data processing apparatus for carrying out workload management with respect to a group of servers in an asynchronous client/server computing system, has: a means for receiving a work request from a client application; a means for consulting availability data concerning the group of servers and for selecting a particular server in the group to be used to satisfy the received work request on the basis of the consulted availability data, where the consulted availability data is always used in its present state when the work request is received, irrespective of whether availability data has been received for each server in the group, in order to select a server from the group; and a means for placing the received work request in a transmission queue where it awaits transmission to the particular server in the group.

Preferably, the apparatus further has: a means for determining whether the availability data has changed since the work request was received; and a means for consulting the changed availability data, if the availability data has changed, and for selecting a server in the group to satisfy the received work request on the basis of the changed availability data; and a means for updating the work request in the transmission queue so that the work request will be sent to a server in the group different from said particular server, if the server selected on the basis of the changed availability data is different from the particular server.

Further preferably, the changed availability data includes adding availability data for a server in the group which did not have availability data available when the work request was first received. Alternatively, the changed availability data includes modifying availability data for a server in the group which had availability data available when the work request was first received.

According to a second aspect, the invention provides a method of carrying out the functionality of the workload management apparatus described above in the first aspect.

According to a third aspect, the invention provides a computer program product stored on a computer readable storage medium for, when run on a computer, carrying out the functionality of the first aspect.

Thus, with the present invention, the workload management unit software can be greatly simplified, since there is no need to continually check whether all of the server availability data has been received. Instead, a simple software architecture can be used where all client requests are treated alike, i.e., as soon a request is issued by a client, a decision is made using the present state of the server availability data and the request is sent to the transmission queue. Also, the destination is recorded in persistent storage as part of the same operation that records the client request itself.

Should new availability data be available before the request is sent from the transmission queue to the selected server, a new choice of server can be made and the queued request can be updated to be sent to a different server. However, if no new availability data is available before the request is sent from the transmission queue, the request is sent to the selected server regardless of whether availability data of each server in the group is available. Thus, an added advantage is that there is no transmission delay suffered from the workload management unit having to wait until availability from each server is available. The present invention uses the availability data that is presently available when a work request is just received to make an initial decision as to which server in the group should be selected. Only in unusual circumstances does new availability data come to light, requiring that a new record is made of the destination.

BRIEF DESCRIPTION OF THE DRAWINGS

An embodiment of the present invention will now be described while drawing reference to the following figures:

FIG. 1 is a block diagram showing the basic client/server environment in which the preferred embodiment of the present invention operates;

FIG. 2 is a flowchart illustrating the steps taken by the messaging and queuing unit in accordance with a preferred embodiment of the present invention; and FIG. 3 is a table showing the availability data consulted by the workload management unit of the messaging and queuing unit in accordance with a preferred embodiment of the present invention.

DETAILED DESCRIPTION OF THE PREFERRED EMBODIMENTS

In FIG. 1 a client data processing device 11 is communicating with a group 12 of server data processing devices (121, 122, 123) over a communications network 13. The client 11 and group of servers 12 are running a messaging and queuing software product, such as IBM's MQSeries, so that asynchronous communication takes place between the client and servers. That is, when the client sends a work request to a server, the server does not have to be operable. The request will be placed in a queue and the server can retrieve the queued request at a later time when the server is operable. The messaging and queuing product also performs any necessary communication protocol conversions in order to allow the client 11 to talk to the group of servers 12 over the network 13.

While, in the preferred embodiment, the client and servers are located in separate processing units connected by a network 13, the invention is by no means limited to this architecture. The client and server group could be located on the same data processing unit.

Client 11 contains a client application 111 and a messaging and queuing software system 112 which includes a workload management unit 112a and a transmission queue 112b. Client application 111 is the consuming software portion that issues work requests to a server. Once the server has carried out the requested work, a result may be returned to the client application 111. Transmission queue 112b is part of the messaging and queuing software structure and is used to queue up work requests received from client application 111 before such work requests are communicated over the network 13 to the group of servers 12. Workload management unit 112a, also part of the messaging and queuing software, is the software element that is responsible for selecting one of the servers 121, 122, 123 from the server group 12 for each work request received from client application 112.

Workload management unit 112a receives data (hereinafter referred to as "availability data") concerning each of the servers 121, 122, 123 in the group over network 13. This data indicates the present availability of each server in terms of how ready is each server to accept a new work request from a client. The workload management unit uses this availability data in order to decide which server 121, 122 or 123 should be selected to satisfy a particular work request.

The operation of the messaging and queuing system 112 will now be described in conjunction with the flowchart of FIG. 2.

At step 21, the messaging and queuing system 112 receives a work request from the client application 111. At step 22, the workload management unit 112a consults a data availability table (see FIG. 3) in order to determine the availability of the servers in the group 12 to process the received work request.

In FIG. 3, the point in time when the work request has just been received is referred to as time 1. At time 1, the availability table indicates that server1 (121) is available for receiving work requests (as indicated by the letter A, for "available" in the box forming the intersection of time 1 and server1). At time 1, the availability table indicates that server2 (122) is not available for receiving work requests (as indicated by the letters NA, for "not available" in the box forming the intersection of time 1 and server2). At time 1, it should be noted that there is no entry in the table of FIG. 3 for server3 (123), thus indicating that server3 has not yet provided its availability data to the messaging and queuing software 112 in the client 11.

Given this state of the availability data at time 1, the workload management unit 112a selects (step 23) the server1 (121) to be assigned to this work request, since server1 is available, server2 is not available and it is unknown whether server3 is available. The work request is then placed (step 24) in the transmission queue 112b and a control indication is added to the work request to indicate that the work request is to be sent to server1 (121). The work request then sits in the queue 112b until the server1 (121) indicates that it is ready to receive requests (perhaps server1 is in a time zone different from client 11 and is not operable at time 1).

At a time 2 which is a little later than time 1, the client 11 has received updated server availability data and such receipt is determined by the messaging and queuing software 112 at step 25. Thus, control loops back to step 22 where the workload management unit 112a again consults the availability data and determines now that: server1 is still available (as indicated by the letter A, for "available" in the box forming the intersection of time 2 and server1); server2 has now become available (as indicated by the letter A, for "available" in the box forming the intersection of time 2 and server2) and server3 is unavailable (as indicated by the letters NA, for "not available" in the box forming the intersection of time 2 and server3). Thus, in the time period between time 1 and time 2, new availability data has been sent from the server group 12 to the client 11, with server 2 changing its availability and server 3 providing availability data when before it had not provided any such data.

Thus, at step 23, the workload management unit 112a selects one of the three servers using this updated availability data. Any programmed workload balancing scheme can be used, but the most efficient would be one where if two servers are available and one has already been selected on a previous pass through the flowchart then this server is retained, so as to avoid having to expend processing power to amend the work request that is sitting in the queue 112b. This also saves a data write operation to local storage, as the selected server for each queued work request must be logged to local storage for recovery purposes in case of a transmission failure. Thus, in this case, step 24 would result in the queued work request not being updated.

Then, at a time 3 which is later than time 2, the work request is still sitting in the queue 112b, and new server availability data has been received, the receipt of such data being noticed by the messaging and queuing software 112 at step 25. Thus, control loops back to step 22 where the availability table of FIG. 3 is again consulted to determine whether it is necessary to alter the selected server based on the new availability data. As shown in FIG. 3, server1 is now unavailable, server2 is still available and server3 is now available. Thus, at step 23 the workload management unit 112a selects either server2 or server3. Again, any common workload balancing algorithm may be used to select which of these two servers should be used. According to the "round-robin" scheme, the server2 is chosen since it is next in line after server1 (and server3 would be next in line for being chosen on a subsequent run).

Then, at step 24, the work request is updated in the transmission queue 112b such that this request now contains an indication that its destination is server2 rather than server1. This also involves having to perform a write to local storage to provide a record for data recovery if necessary.

At some point during this operation, the selected server will fetch the work request from the queue 112b and the request will be transmitted over network 13 to server2, thus ending the cyclic flow of FIG. 2 for a particular work request.

It should be noted that the basic assumption upon which the invention operates is that the server availability data will not change very often and it will be very rare that it will be necessary to take the YES branch at step 25 and loop back to step 22 to again consult the table of FIG. 3. Thus, an initial choice of server is made very early on after the request is issued by the client application. This places the work request into the transmission queue 112b as quickly as possible, while making use of the presently available server availability data, so that requests can be quickly and efficiently processed for transmission to the server group. Only if the server availability data changes will it be necessary to revise the initial server choice.

We claim:

1. A client data processing apparatus for carrying out within a client workload management with respect to a group of servers in an asynchronous client/server computing system, the apparatus comprising:

means for receiving a work request from a client application running on the client data processing apparatus;

means for consulting availability data concerning the group of servers and for selecting a particular server in the group to be used to satisfy the received work request on the basis of the consulted availability data, where the consulted availability data is always used in its present state when the work request is received, irrespective of whether availability data has been received for each server in the group, in order to select a server from the group; and means for placing the received work request in a client-side transmission queue where it awaits transmission from the client data processing apparatus to the particular server in the group.

2. The apparatus of claim 1 further comprising:

means for determining whether the availability data has changed since the work request was received; and means for consulting the changed availability data, if the availability data has changed, and for selecting a server in the group to satisfy the received work request on the basis of the changed availability data; and means for updating the work request in the transmission queue so that the work request will be sent to a server in the group different from said particular server, if the server selected on the basis of the changed availability data is different from the particular server.

3. The apparatus of claim 2 wherein the changed availability data includes adding availability data for a server in the group which did not have availability data available when the work request was first received.

4. The apparatus of claim 2 wherein the changed availability data includes modifying availability data for a server in the group which had availability data available when the work request was first received.

5. A client data processing method of carrying out within a client workload management with respect to a group of servers in an asynchronous client/server computing system, the method comprising steps of:

receiving a work request from a client application;

consulting availability data concerning the group of servers and selecting a particular server in the group to be used to satisfy the received work request on the basis of the consulted availability data, where the consulted availability data is always used in its present state when the work request is received, irrespective of whether availability data has been received for each server in the group, in order to select a server from the group; and placing the received work request in a client-side transmission queue where it awaits transmission from the client to the particular server in the group.

6. The method of claim 5 further comprising steps of:

determining whether the availability data has changed since the work request was received; and consulting the changed availability data, if the availability data has changed, and selecting a server in the group to satisfy the received work request on the basis of the changed availability data; and updating the work request in the transmission queue so that the work request will be sent to a server in the group different from said particular server, if the server selected on the basis of the changed availability data is different from the particular server.

7. The method of claim 6 wherein the changed availability data includes adding availability data for a server in the group which did not have availability data available when the work request was first received.

8. The method of claim 6 wherein the changed availability data includes modifying availability data for a server in the group which had availability data available when the work request was first received.

9. A computer program product stored on a computer readable storage medium for, when executed on a computer, executing a client data processing method of carrying out within a client workload management with respect to a group of servers in an asynchronous client/server computing system, the method comprising steps of:

receiving a work request from a client application;

consulting availability data concerning the group of servers and selecting a particular server in the group to be used to satisfy the received work request on the basis of the consulted availability data, where the consulted availability data is always used in its present state when the work request is received, irrespective of whether availability data has been received for each server in the group, in order to select a server from the group; and placing the received work request in a client-side transmission queue where it awaits transmission from the client to the particular server in the group.

10. The product of claim 9 further comprising steps of:

determining whether the availability data has changed since the work request was received; and consulting the changed availability data, if the availability data has changed, and selecting a server in the group to satisfy the received work request on the basis of the changed availability data; and updating the work request in the transmission queue so that the work request will be sent to a server in the group different from said particular server, if the server selected on the basis of the changed availability data is different from the particular server.

11. The product of claim 10 wherein the changed availability data includes adding availability data for a server in the group which did not have availability data available when the work request was first received.

12. The product of claim 10 wherein the changed availability data includes modifying availability data for a server in the group which had availability data available when the work request was first received.

* * * * *